United States Patent
Vora et al.

(10) Patent No.: US 12,371,030 B2
(45) Date of Patent: Jul. 29, 2025

(54) LOCALIZATION OF A VEHICLE

(71) Applicant: Ford Global Technologies, LLC, Dearborn, MI (US)

(72) Inventors: Ankit Girish Vora, Northville, MI (US); Nalin Bendapudi, Ann Arbor, MI (US); Siddharth Agarwal, Ann Arbor, MI (US); Devarth Parikh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 18/066,299

(22) Filed: Dec. 15, 2022

(65) Prior Publication Data
US 2024/0199035 A1   Jun. 20, 2024

(51) Int. Cl.
  *B60W 40/10* (2012.01)
  *B60R 1/23* (2022.01)
  *B60W 60/00* (2020.01)
  *G01C 21/30* (2006.01)

(52) U.S. Cl.
  CPC ............... *B60W 40/10* (2013.01); *B60R 1/23* (2022.01); *B60W 60/001* (2020.02); *G01C 21/30* (2013.01); *B60R 2300/60* (2013.01); *B60W 2420/403* (2013.01)

(58) Field of Classification Search
  CPC ............... B60W 40/10; B60W 60/001; B60W 2420/403; B60R 1/23; B60R 2300/60; G01C 21/30
  See application file for complete search history.

(56) References Cited

U.S. PATENT DOCUMENTS

| | | | |
|---|---|---|---|
| 10,452,927 B2 | 10/2019 | Stojanovic et al. | |
| 10,699,571 B2 | 6/2020 | Vora et al. | |
| 10,739,459 B2 | 8/2020 | Castorena Martinez | |
| 10,777,084 B1 | 9/2020 | Vora et al. | |
| 10,852,146 B2 | 12/2020 | Agarwal et al. | |
| 11,237,269 B2 | 2/2022 | Vora et al. | |
| 2014/0343842 A1* | 11/2014 | Ranganathan | G01C 21/30 701/472 |
| 2019/0331497 A1* | 10/2019 | Vora | G01C 21/28 |
| 2020/0202104 A1* | 6/2020 | Sohn | G06V 20/56 |
| 2022/0026920 A1 | 1/2022 | Ebrahimi Afrouzi et al. | |
| 2022/0390239 A1* | 12/2022 | Eisenmann | G01C 21/30 |

* cited by examiner

Primary Examiner — Kito R Robinson
Assistant Examiner — Roy Rhee
(74) Attorney, Agent, or Firm — Frank A. MacKenzie; Brooks Kushman P.C.

(57) ABSTRACT

A computer includes a processor and a memory, and the memory stores instructions executable by the processor to receive a first top-view image of an area obtained from a sensor external to a vehicle, generate a second top-view image of the area based on data from a camera of the vehicle, and determine an estimated location of the vehicle in the area based on comparing the first top-view image and the second top-view image.

19 Claims, 6 Drawing Sheets

LOCALIZATION OF A VEHICLE

BACKGROUND

Some vehicles are autonomous or semi-autonomous. A computer can be programmed to operate the vehicle independently of the intervention of a human operator, completely or to a lesser degree. The computer may be programmed to operate a propulsion system, a brake system, a steering system, and/or other vehicle systems. For the purposes of this disclosure, autonomous operation means the computer controls the propulsion system, brake system, and steering system without needing input from a human operator; semi-autonomous operation means the computer controls one or two of the propulsion system, brake system, and steering system and a human operator controls the remainder, or that the computer controls all three of the propulsion system, the brake system, and the steering system but the human operator must be prepared to take over control of the vehicle; and nonautonomous operation means a human operator controls the propulsion system, brake system, and steering system.

DETAILED DESCRIPTION

Figure 1:
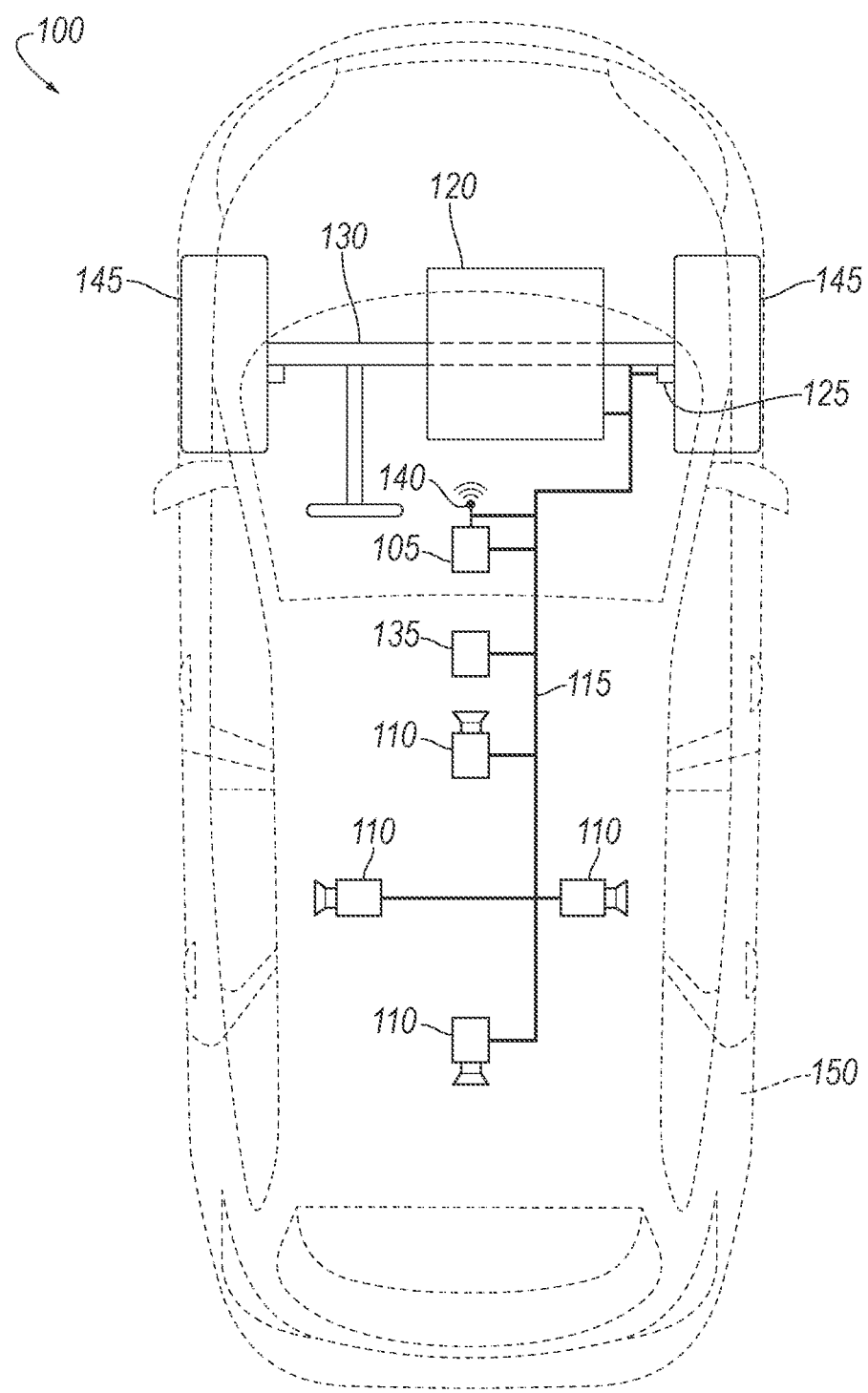
FIG. 1 is a diagrammatic top view of an example vehicle.

Autonomous and semi-autonomous vehicles sometimes use digital maps for navigation. This disclosure provides techniques for localizing a vehicle within a geographical area, e.g., with reference to a generated digital map of the area. Digital maps typically include road data, intersections, number of lanes in a road, building locations, etc. Techniques described herein can reduce the time and/or computing resources to create a digital map.

A computer of a vehicle can receive a first top-view image of the area obtained from a sensor external to a vehicle (e.g., a satellite image), generates a second top-view image of the area based on data from at least one camera of the vehicle, and determines an estimated location of the vehicle in the area based on comparing the first top-view image and the second top-view image. Typically, vehicle computers estimate vehicle locations based on generated high-definition (HD) maps. Generating such HD maps is typically very time-consuming and expensive in terms of computer processing resources. Thus, advantageously, the present system can provide better computer processing and efficiency by estimating the location of the vehicle without incurring the requirements to generate HD maps.

A computer includes a processor and a memory, and the memory stores instructions executable by the processor to receive a first top-view image of an area obtained from a sensor external to a vehicle, generate a second top-view image of the area based on data from a camera of the vehicle, and determine an estimated location of the vehicle in the area based on comparing the first top-view image and the second top-view image.

In an example, the instructions to generate the second top-view image may include instructions to generate the second top-view image based on image data from a plurality of cameras of the vehicle including the camera. In a further example, the cameras may be oriented generally horizontally, and the instructions to generate the second top-view image may include instructions to project the image data from the cameras to a common horizontal plane.

In an example, the instructions to compare the first top-view image and the second top-view image may include instructions to identify a best match region of the first top-view image to the second top-view image. In a further example, the instructions to identify the best match region may include instructions to compare each of a plurality of regions of the first top-view image to the second top-view image. In a yet further example, the instructions to identify the best match region may include instructions to determine a score of each region of the first top-view image by comparing the respective region to the second top-view image and to identify the best match region by selecting the region with the best score.

In another yet further example, the instructions may further include instructions to determine the plurality of regions based on an identified location of the vehicle.

In another further example, the instructions may further include instructions to determine an estimated heading of the vehicle by rotating the second top-view image and determining the best match region by comparing the second top-view image to the first top-view image after rotating the second top-view image.

In an example, the instructions to determine the estimated location may include instructions to apply an image location of the vehicle in the second top-view image to the first top-view image.

In an example, the instructions may further include instructions to determine a location of the vehicle based on the estimated location and on a previous location of the vehicle. In a further example, the instructions to determine the location of the vehicle may further include instructions to iteratively filter the estimated location and the previous location.

In an example, the estimated location may include two horizontal coordinates.

In an example, the instructions may further include instructions to determine an estimated heading of the vehicle based on comparing the first top-view image and the second top-view image.

In an example, the first top-view image may lack metadata of lanes.

In an example, the first top-view image may be grayscale.

In an example, the second top-view image may be grayscale.

In an example, the first top-view image is a satellite image.

In an example, the instructions may further include instructions to actuate a component of the vehicle based on the estimated location. In a further example, the instructions to actuate the component may include instructions to navigate the vehicle based on the estimated location.

A method includes receiving a first top-view image of an area obtained from a sensor external to a vehicle, generating a second top-view image of the area based on data from a camera of the vehicle, and determining an estimated location of the vehicle in the area based on comparing the first top-view image and the second top-view image.

With reference to the Figures, wherein like numerals indicate like parts throughout the several views, a computer 105 includes a processor and a memory, and the memory stores instructions executable by the processor to receive a first top-view image 300 of an area 200 obtained from a sensor external to a vehicle 100, generate a second top-view image 400 of the area 200 based on data from at least one camera 110 of the vehicle 100, and determine an estimated location 505 of the vehicle 100 in the area 200 based on comparing the first top-view image 300 and the second top-view image 400.

With reference to FIG. 1, the vehicle 100 may be any passenger or commercial automobile such as a car, a truck, a sport utility vehicle, a crossover, a van, a minivan, a taxi, a bus, an unmanned or remotely controlled robotic vehicle, etc.

The vehicle 100 may be an autonomous, semi-autonomous, or non-autonomous vehicle. The computer 105 may be programmed to operate the vehicle 100 independently of the intervention of a human operator, completely or to a lesser degree. The computer 105 may be programmed to operate a propulsion system 120, a brake system 125, a steering system 130, and/or other vehicle systems. For the purposes of this disclosure, autonomous operation means the computer 105 controls the propulsion system 120, brake system 125, and steering system 130 without input from a human operator; semi-autonomous operation means the computer 105 controls one or two of the propulsion system 120, brake system 125, and steering system 130 and a human operator controls the remainder, or that the computer 105 controls all three of the propulsion system 120, the brake system 125, and the steering system 130 but the human operator must be prepared to take over control of the vehicle 100; and nonautonomous operation means a human operator controls the propulsion system 120, brake system 125, and steering system 130.

The vehicle 100 includes the computer 105. The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 115 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the propulsion system 120, the brake system 125, the steering system 130, sensors 135 including the cameras 110, a transceiver 140, and other components via the communications network 115.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels 145; an electric powertrain including batteries, an electric motor, and a transmission that transfers rotational motion to the wheels 145; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels 145. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The sensors 135 may provide data about operation of the vehicle 100, for example, wheel speed, wheel orientation, engine and transmission data (e.g., temperature, fuel consumption, etc.), speed of the vehicle 100, etc. For example, the sensors 135 may include a speedometer and/or a vehicle speed sensor. The sensors 135 may detect the location and/or orientation of the vehicle 100. For example, the sensors 135 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 135 may detect the external world, e.g., objects and/or characteristics of surroundings of the vehicle 100, such as other vehicles, road lane markings, traffic lights and/or signs, pedestrians, etc. For example, the sensors 135 may include radar sensors, ultrasonic sensors, scanning laser range finders, light detection and ranging (lidar) devices, and the cameras 110.

The cameras 110 can detect electromagnetic radiation in some range of wavelengths. For example, the cameras 110 may detect visible light, infrared radiation, ultraviolet light, or some range of wavelengths including visible, infrared, and/or ultraviolet light. For example, the cameras 110 can be a charge-coupled devices (CCD), complementary metal oxide semiconductors (CMOS), or any other suitable type.

The cameras 110 are fixed relative to the vehicle 100, e.g., fixedly mounted to a body 150 of the vehicle 100. The cameras 110 may be oriented generally horizontally. A center of a field of view of each camera 110 may be closer to horizontal than to vertical, e.g., may be tilted slightly downward from horizontal. The cameras 110 may collectively provide a 360° horizontal field of view around the vehicle 100. For example, the field of view of each camera 110 may overlap with the fields of view of the two adjacent cameras 110. For example, the vehicle 100 may include four cameras 110 aimed in a vehicle-forward direction, a vehicle-left direction, a vehicle-rearward direction, and a vehicle-right direction, respectively.

The transceiver 140 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 140 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, an internet service provider (ISP), etc. The transceiver 140 may be one device or may include a separate transmitter and receiver.

Figure 2:
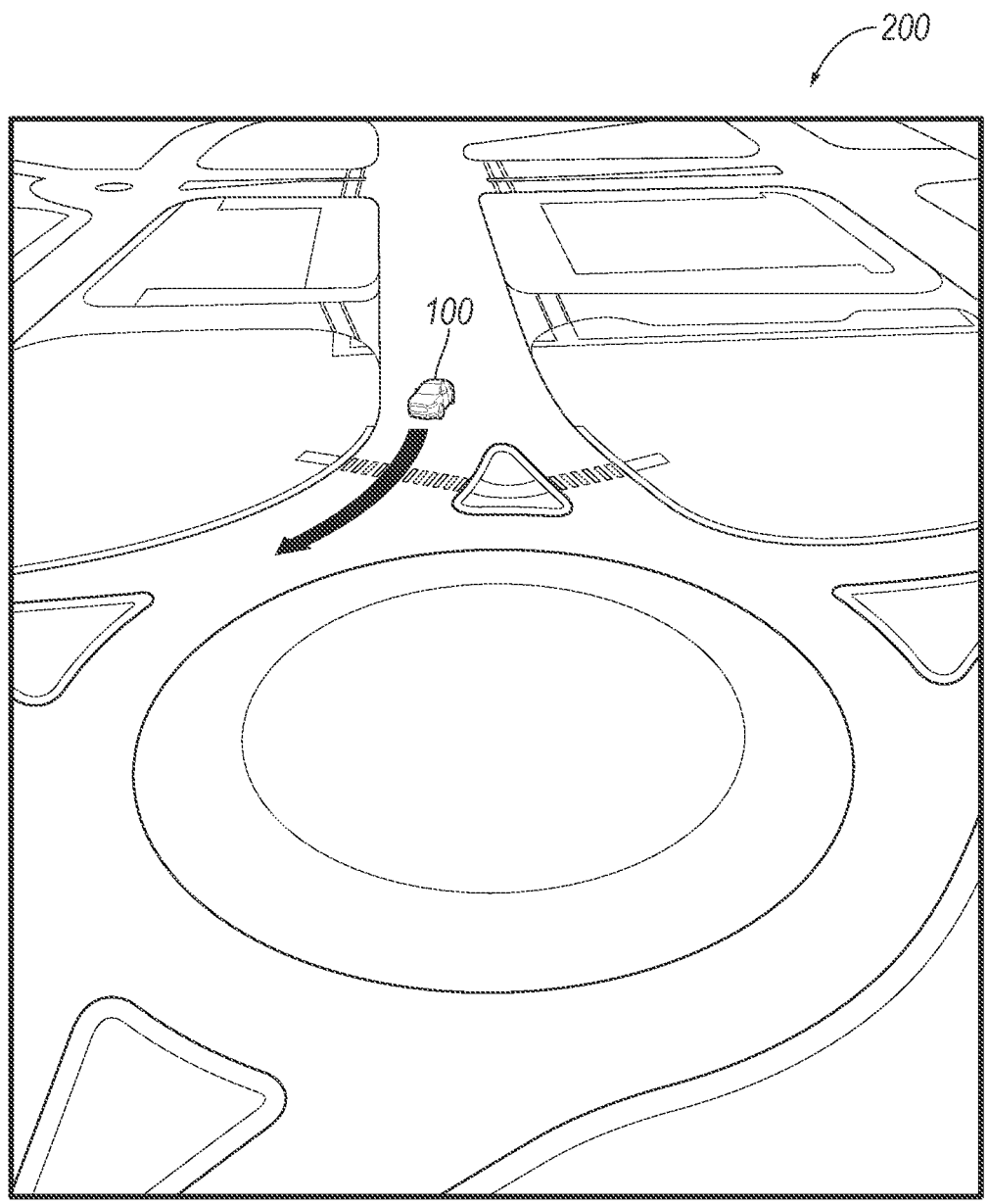
FIG. 2 is a perspective view of an example area through which the vehicle is traveling.

With reference to FIG. 2, the vehicle 100 is traveling through the area 200. A geographic area (or simply area) in the context of this disclosure means a two-dimensional area on the surface of the earth. Boundaries or edges of an area 200 may be defined by global positioning system (GPS) coordinates, e.g., as vertices of a triangular or rectangular area, a center of a circular area, etc. An area 200 may have any dimensions and/or shape, e.g., rectangular, oval, circular, non-geometrical shape, etc. For example, an area 200 may include a neighborhood, a town, an airport, etc.

An area 200 may include features. In the present context, a "feature" of an area 200 includes physical characteristic or structure of the area 200, such as edges (e.g., a road boundary, a metal guard boundary, etc.) on a ground surface, a shape (e.g., of a structure), a gradient (or slope), a pattern (e.g., of a roundabout), a building, a bridge, a traffic light, a delineator, and a raised pavement marker. A road can be any type of dirt road or paved road, e.g., covered by concrete, asphalt, tar, etc. A road may have one or more lanes. A road may be one-way or two-way. A roundabout may have a circular or oval shape. An intersection may be a location where two or more roads intersect. A road marker may be a raised and/or flush pavement marker formed of metal, plastic, etc., that is mounted to and/or embedded in a road surface, and/or a painted marking on the road surface. A boundary (or edge) of a road is a set of points defining location where a road surface material, e.g., asphalt, ends. In the present context, the boundary may additionally or alternatively include one or more physical roadway features such as a traffic barrier including metal guardrail boundaries, one or more road markers such as a painted line or lines, etc. An area 200 may include any type of structures such as traffic sign(s), bridge(s), etc. and/or vegetation(s), hill(s), mountain(s), etc.

As the vehicle 100 is traveling through the area 200, the vehicle 100 has a location with respect to the area 200 and a heading with respect to the area 200. The location may have two horizontal coordinates (e.g., specifying a location on the surface of the Earth), and the estimations of the location discussed throughout this disclosure may likewise have two horizontal coordinates. The heading is the horizontal forward direction defined by the orientation of the vehicle 100. The location and the heading are estimated by the computer 105 as described below.

Figure 3:
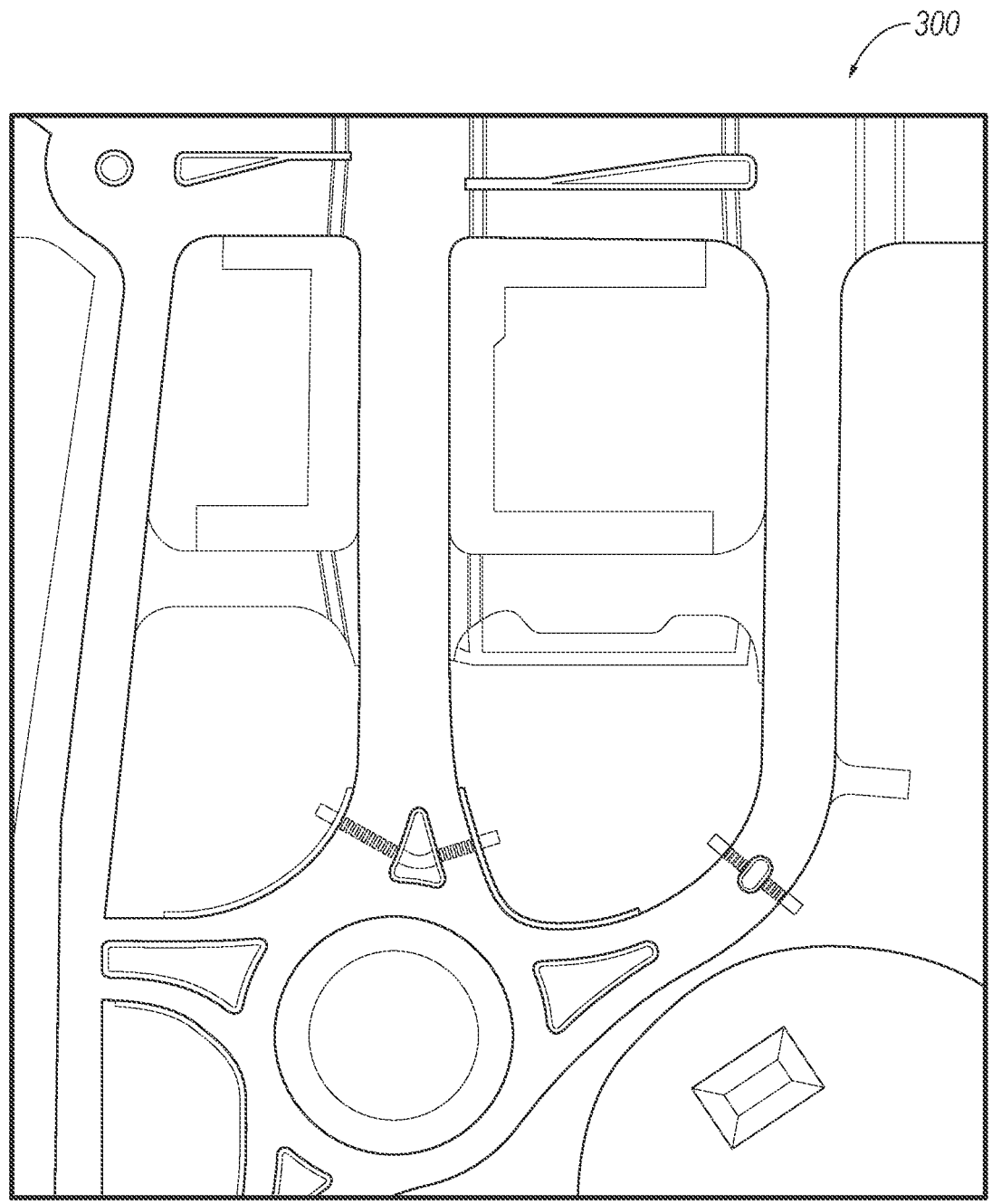
FIG. 3 is a representation of an example first top-view image of the area obtained by a sensor external to the vehicle.

FIG. 3 is a representation of the first top-view image 300. The first top-view image 300 is an image of the area 200 obtained by a sensor external to the vehicle 100, e.g., a camera above the ground. The sensor is unattached to the vehicle 100 and spaced from the vehicle 100. To capture an aerial or top-view image of the area 200, the sensor, e.g., camera, may be mounted to a satellite, aircraft, helicopter, unmanned aerial vehicles (or drones), balloon, stand-alone pole, a ceiling of a building, etc. In particular, the first top-view image 300 may be a satellite image, i.e., an image captured from a sensor on board a satellite.

The first top-view image 300 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the first top-view image 300, i.e., position in the field of view of the sensor external to the vehicle 100 at the time that the first top-view image 300 was recorded, can be specified in pixel dimensions or coordinates, e.g., an ordered pair of pixel distances, such as a number of pixels from a top edge and a number of pixels from a left edge of the image frame, or from some other reference point in the first top-view image 300.

The first top-view image 300 may lack metadata of the features of the area 200, e.g., of the lanes of the roads, of the traffic signs, of the buildings, etc. The metadata of the features are data, other than the pixels, that describe the features. The metadata may specify a type of the feature and/or boundaries of the feature. For example, a plurality of GPS coordinates labeled as a road boundary is metadata, and a change in color or intensity of the pixels corresponding to a road boundary is not metadata. Top-view images lacking metadata of the features are readily available, and the techniques described herein permit the computer 105 to estimate a location of the vehicle 100 despite the lack of the metadata about features, e.g., despite the lack of metadata about the lanes on which the vehicle 100 may be traveling. The first top-view image 300 may still include metadata unrelated to the features, e.g., a timestamp or a location of the first top-view image 300. The location of the first top-view image 300 may be a GPS coordinate of a reference point of the first top-view image 300, e.g., an upper left corner or a center point of the first top-view image 300.

The computer 105 is programmed to receive the first top-view image 300. For example, the computer 105 may receive the first top-view image 300 via the transceiver 140 from a remote server. The first top-view image 300 may be publicly available, and the computer 105 may request the first top-view image 300 from an ISP via the transceiver 140, e.g., based on a GPS location of the vehicle 100. For another example, the first top-view image 300 may be stored in the memory of the computer 105. The computer 105 may access the first top-view image 300 from the memory, e.g., based on the GPS location of the vehicle 100.

Figure 4:
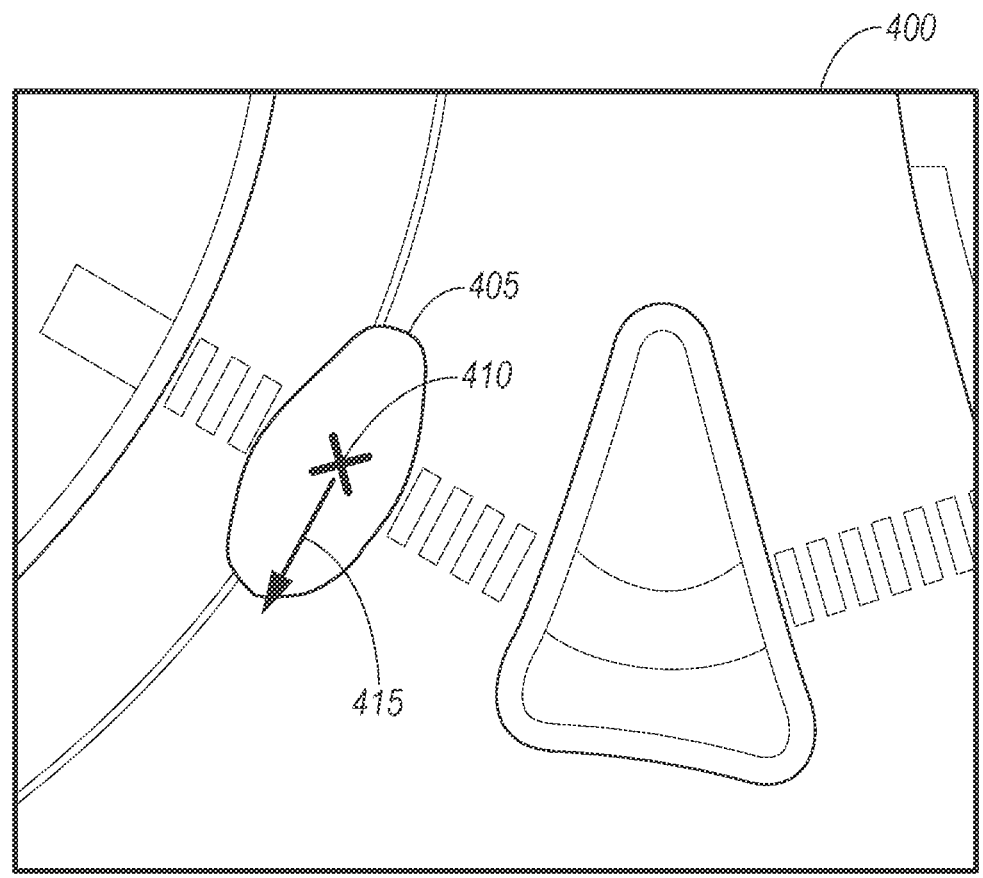
FIG. 4 is a representation of an example second top-view image generated from data from cameras on board the vehicle.

FIG. 4 is a representation of the second top-view image 400. The second top-view image 400 is an artificial image, i.e., a synthetic image, i.e., an image that is computer-generated rather than obtained by a camera. The second top-view image 400 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the second top-view image 400 can be specified in pixel dimensions or coordinates, e.g., an ordered pair of pixel distances, such as a number of pixels from a top edge and a number of pixels from a left edge of the image frame. The second top-view image 400 may lack metadata of the features of the area 200, like the first top-view image 300.

The computer 105 is programmed to generate the second top-view image 400 of the area 200 based on data from at least one camera 110, e.g., from the plurality of cameras 110, of the vehicle 100. For example, the computer 105 may project the image data from the cameras 110 to a common horizontal plane. Each camera 110 may have an image plane as an intrinsic characteristic of the camera 110. The position and orientation of the camera 110 relative to the vehicle 100 defines a geometric transformation from the image plane to the common horizontal plane. The computer 105 may apply the respective geometric transformations to respective images received from the respective cameras 110 at a same time in order to transform the images to the common horizontal plane. The results of the geometric transformations may then be overlayed in the common horizontal plane in positions defined by the geometric transformations, resulting in a single image. The second top-view image 400 may include a blank region 405 in which the vehicle 100 is located because the cameras 110 face outward from the vehicle 100 and may not provide coverage under or near the vehicle 100.

The vehicle 100 has an image location 410 and image orientation 415 within the second top-view image 400. The image location 410 and image orientation 415 may be defined by the geometric transformations. The image location 410 may be within the blank region 405.

The computer 105 may be programmed to convert the first top-view image 300 and/or the second top-view image 400 to grayscale. For the purposes of this disclosure, a "grayscale" image is defined as an image for which each pixel has a value on a single dimension, i.e., a scalar value, e.g., an intensity. The computer 105 may use any suitable algorithm for converting a color image to a grayscale image, e.g., a linear or nonlinear weighted sum of values for color channels of the color image, e.g., of values for red, green, and blue. Alternatively, the first top-view image 300 may be grayscale when received, and/or the second top-view image 400 may be grayscale when generated, e.g., by being generated from grayscale image data from the cameras 110.

With reference to FIGS. 3 and 4, the computer 105 is programmed to determine an estimated location 505 of the vehicle 100 in the area 200 based on comparing the first top-view image 300 and the second top-view image 400. The computer 105 may determine a plurality of regions of the first top-view image 300, determine a score of each region by comparing the region to the second top-view image 400, and identify a best match region to the second top-view image 400 from the regions by selecting the region with the best score, as will be described in turn.

The computer 105 may be programmed to determine the plurality of regions of the first top-view image 300 based on an identified location of the vehicle 100. The identified location is a location derived other than from the techniques described herein, e.g., the GPS location of the vehicle 100, a location estimated by infrastructure around the vehicle 100 and transmitted via the transceiver 140, etc. For example, the computer 105 may determine the regions of the first top-view image 300 rather than regions of other top-view images obtained from the external sensor based on the identified location being within the area 200 encompassed in the first top-view image 300. The regions may be of equal size. For example, the regions may each have the same pixel dimensions as the second top-view image 400. The computer 105 may determine the regions by sweeping a window having the same pixel dimensions as the second top-view image 400 over the first top-view image 300 by incremental longitudinal, lateral, diagonal, and/or rotational steps. The placement of the window at each incremental step defines one of the regions. The regions may overlap each other. The computer 105 may sweep the window over the first top-view image 300 in a pattern. The pattern may be centered on the pixel coordinates of the identified location in the first top-view image 300. For example, the location of the window in the first top-view image 300 may be specified by a reference point, e.g., a center point of the window. The reference point may be represented as pixel coordinates ($x_0$, $y_0$) in the first top-view image 300. The computer 105 may sweep the window over the first top-view image 300 in the incremental steps. The incremental steps may include changes to the reference point, e.g., by incrementing the values of $x_0$ and/or $y_0$ by a preset small amount, e.g., 10 cm. The incremental steps may include changes to the orientation of the window, e.g., rotating the window about the reference point relative to the first top-view image 300 by a preset small angle, e.g., 5°.

The computer 105 may be programmed to compare each region of the first top-view image 300 to the second top-view image 400 in order to determine a score of each region. The score for a given region may represent a similarity or a difference between the region and the second top-view image 400. For example, the score may be based on the normalized mutual information (NMI) between the second top-view image 400 and the region of the first top-view image 300, which is based on the entropy of the region, the entropy of the top-view image 400, and the joint entropy of the region and the top-view image 400. For the purposes of this disclosure, "entropy" is used in its information theory sense. In particular, the score may be a quotient of a sum of the entropies of the region and the top-view image 400 and the joint entropy of the region and the top-view image 400, such as in the following equation:

$$NMI(M, L_i) = \frac{H(M) + H(L_i)}{H(M, L_i)}$$

in which H is the entropy of the variable or the joint entropy of two variables, M is the second top-view image 400, $L_i$ is the region of the first top-view image 300, and i is an index of the regions. Alternatively, the variables M and $L_i$ may be for one color channel of the first top-view image 300 and the second top-view image 400 (e.g., red, green, or blue), respectively, and the normalized mutual information NMI may be calculated once for each color channel and summed or multiplied together.

For another example, the score may be based on a pixel-by-pixel difference in values between the region of the first top-view image 300 and the second top-view image 400, e.g., a summation of the differences in values for the respective pixels, as in the following equation:

$$Diff = \sum_{x=-n/2}^{n/2} \sum_{y=-m/2}^{m/2} |I_1(X(x_0, y_0, x, y, \alpha)) - I_2(x, y)|$$

in which n and m are the dimensions of the second top-view image 400, x and y are indexes of the pixel coordinates of the pixels of the second top-view image 400, $x_0$ and $y_0$ are the pixel coordinates of the reference point for the region in the first top-view image 300, $\alpha$ is the rotation of the window relative to the first top-view image 300, X is a mapping of the two-dimensional pixel coordinates (x, y) of the second top-view image 400 to the two-dimensional pixel coordinates of the first top-view image 300 based on the reference point ($x_0$, $y_0$) and the angle $\alpha$, $I_1$ is the value of the pixel in the first top-view image 300, and $I_2$ is the value of the pixel in the second top-view image 400. The mapping X rotates the second top-view image 400 by the angle $\alpha$ and accounts for the location of the pixel of interest. The pixel values $I_1$ and $I_2$ may be taken from the grayscale versions of the first top-view image 300 and the second top-view image 400. Alternatively, the pixel values $I_1$ and $I_2$ may be the values of one color channel of the first top-view image 300 and the second top-view image 400 (e.g., red, green, or blue), respectively, and the difference may be calculated once for each color and summed together to arrive at the score, e.g., $Diff=Diff_{red}+Diff_{green}+Diff_{blue}$.

The computer 105 may be programmed to identify a best match region of the first top-view image 300 to the second top-view image 400 by selecting the region with the best score. The best match region is the one of the regions of the first top-view image 300 that is most similar to the second top-view image 400. The best score is a highest similarity score or a lowest difference score. For the first example of the score above, the best match region may be identified by the two-dimensional pixel coordinates (x, y) and the rotation $\alpha$ that maximizes the normalized mutual information NMI, e.g., as in the following equation:

$$(\hat{x}, \hat{y}, \hat{\alpha}) = \underset{x \in \mathcal{X}, y \in \mathcal{Y}, \alpha \in \mathcal{A}}{\operatorname{argmax}} NMI(M, L_i)$$

in which the circumflex represents the value of a variable for the best match region, and $\mathcal{X}$, $\mathcal{Y}$, and $\mathcal{A}$ represent the search space for the pixel coordinates (x, y) and the rotation $\alpha$. For the second example of the score above, the region with the smallest value for Diff is selected.

Figure 5:
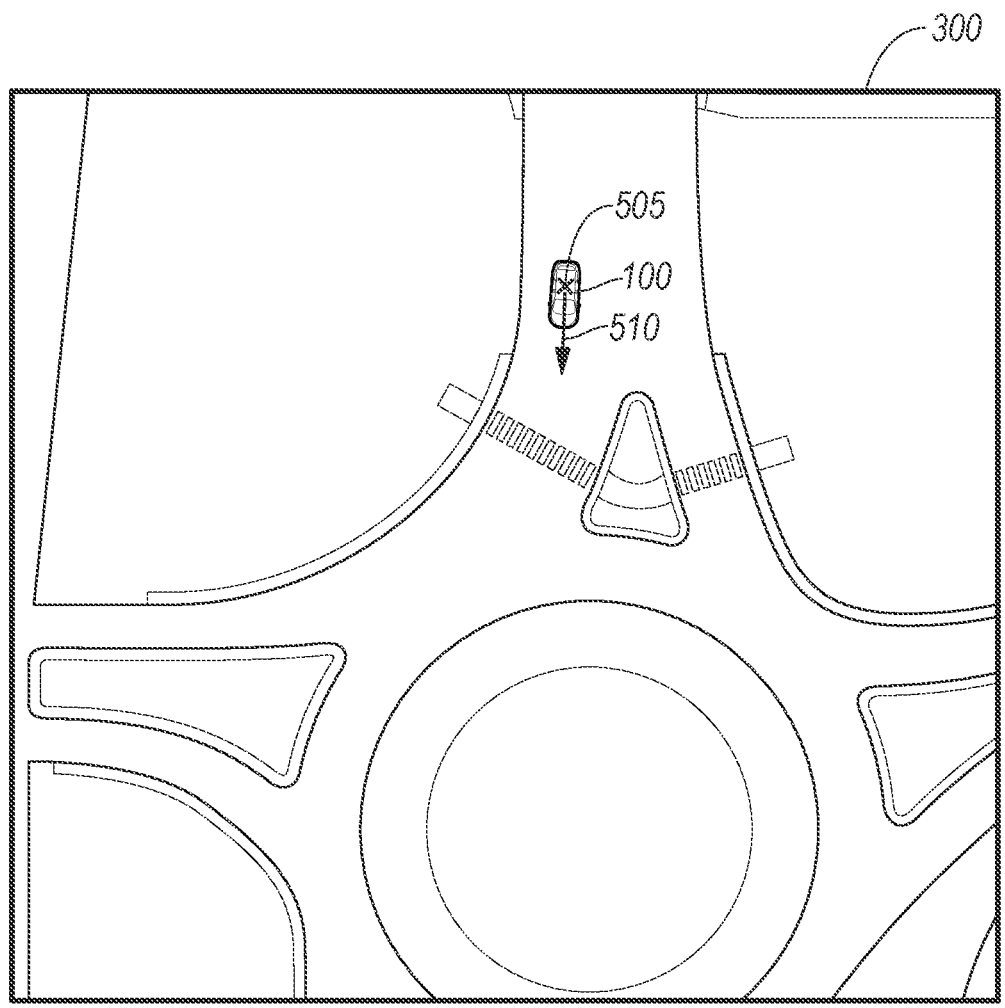
FIG. 5 is a partial representation of the first top-view image of the area with a location and heading of the vehicle indicated.

With reference to FIG. 5, the computer 105 may be programmed to determine an estimated location 505 and estimated heading 510 by applying an image location 410 and image orientation 415 of the vehicle 100 in the second top-view image 400 to the first top-view image 300. The estimated location 505 may be represented by pixel coordinates within the first top-view image 300, and the estimated heading 510 may be an angle relative to the first top-view image 300. The image location 410 in the second top-view image 400 may be known based on the geometric transformations used to generate the second top-view image 400. For example, the vehicle 100 may be at the center of the second top-view image 400, i.e., (0, 0) when the reference point is taken as the center of the second top-view image 400. The estimated location 505 in the first top-view image 300 may be the sum of the reference point of the selected region and the image location 410 within the second top-view image 400, e.g., ($x_0$+0, $y_0$+0)=($x_0$, $y_0$). The image orientation 415 in the second top-view image 400 may be known based on the geometric transformations used to generate the second top-view image 400. For example, the image orientation 415 may be straight upward in the second top-view image 400, i.e., 0°. The estimated heading 510 in the first top-view image 300 may be the sum of the image orientation 415 and the rotation of the second top-view image 400 relative to the first top-view image 300, e.g., 0°+$\alpha$=$\alpha$.

The computer 105 may be programmed to determine a location and/or heading of the vehicle 100 based on the estimated location 505 and on a previous location of the vehicle 100 and/or based on the estimated heading 510 and a previous heading of the vehicle 100. The previous location may be the location as determined below from an earlier timestep, e.g., an immediately previous timestep. The previous heading may be the heading as determined from the earlier timestep. For example, the computer 105 may iteratively filter the estimated location 505, the estimated heading 510, the previous location, and the previous heading. The computer 105 may execute a Kalman filter, an average filter, a particle filter, etc., with the estimated location 505, the estimated heading 510, the previous location, and the previous heading as inputs.

For example, the computer 105 may execute a Kalman filter. A Kalman filter works by forming a feedback loop between a prediction step, i.e., predicting the vehicle pose and error estimates for a next timestep using prediction equations, and a measurement step, i.e., adjusting the predictions with measurements from the sensors 135 using measurement equations. The vehicle pose includes at least the location and heading, and the vehicle pose may further include spatial and/or angular velocity, acceleration, etc. During each timestep, the computer 105 may perform the prediction step and the measurement step, as well as determine the estimated location 505 and the estimated heading 510 by comparing the first top-view image 300 and the second top-view image 400, as described above.

The prediction equations include an equation for a predicted pose X' and an equation for a predicted error estimate P', which may be a matrix of covariances. For example, the predicted pose X' at a timestep k may be a matrix product of a state transition matrix F and the pose from an immediately previous timestep k−1. The predicted error at the timestep k may be a matrix product of the state transition matrix F, the error P, and a transpose of the state transition matrix F from the immediately previous timestep k−1, possibly summed with a process noise matrix Q from the previous timestep k−1, as shown:

$$X'_k = F_{k-1} X_{k-1}$$

$$P'_k = F_{k-1} P_{k-1} F_{k-1}^T + Q_{k-1}$$

The state transition matrix F may be determined based on a dynamic model of the vehicle 100. The state transition matrix F may describe the relationship of variables and derivatives of the variables included in the pose X of the vehicle 100. In a simplified example, the state transition matrix F may be an identity matrix, i.e., a square matrix in which all the elements of a principal diagonal are ones and all other elements are zeros. An effect of multiplying a matrix by an identity matrix is to leave the respective matrix unchanged. The process noise matrix Q represents a noise resulting physical attributes of the vehicle 100.

The measurement equations include an equation for a gain matrix K, the pose X, and the error estimate P. The gain matrix K is used in the equations for the pose X and the error estimate P. For example, the gain matrix K is based on the predicted error estimate P', a sensor model matrix H, and a measurement noise matrix R. The sensor model matrix H represents a model for mapping from the output of the sensors 135 to the pose. The measurement noise matrix R represents noise included in measurements by the sensors 135, which is a characteristic of the sensors 135. The pose X is based on the predicted pose X', the gain matrix K, an estimated pose matrix Z, and the sensor model matrix H. The estimated pose matrix Z includes the estimated location 505 and the estimated heading 510 determined from comparing the first top-view image 300 and the second top-view image 400 in the manner described above. The error estimate P is based on the gain matrix K, the sensor model matrix H, the predicted error estimate P', and the measurement noise matrix R. For example, the measurement equations may be the following:

$$K_k = P'_k H_k^T (T_k P'_k H_k^T + R_k)^{-1}$$

$$X_k = X'_k + K_k(Z_k + H_k X'_k)$$

$$P_k = (I - K_k H_k) P'_k (I - K_k H_k)^T + K_k R_k K_k^T$$

Figure 6:
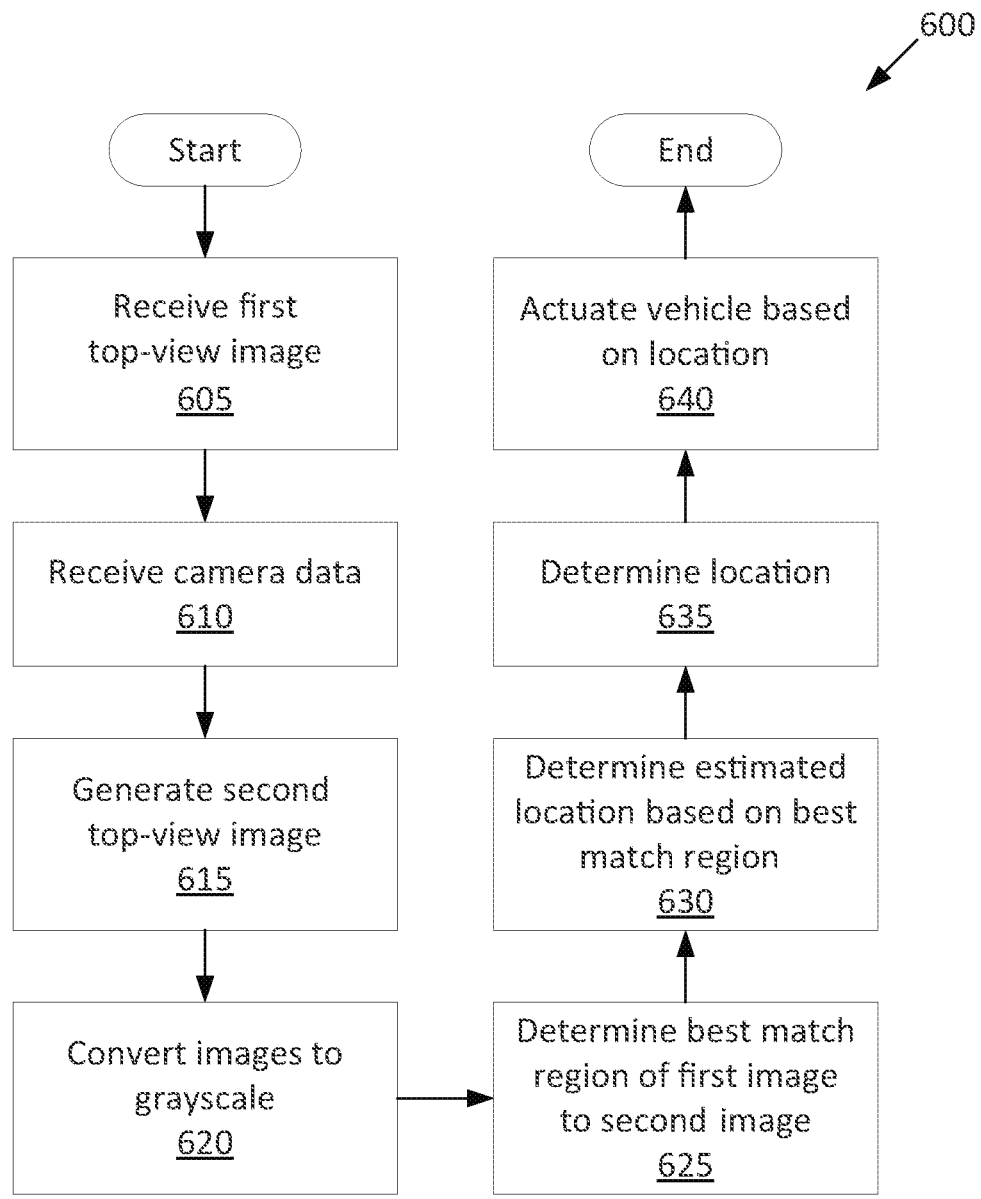
FIG. 6 is a process flow diagram of an example process for determining a location of the vehicle from the top-view images.

FIG. 6 is a process flow diagram illustrating an example process 600 for determining the location of the vehicle 100. The memory of the computer 105 stores executable instructions for performing the steps of the process 600 and/or programming can be implemented in structures such as mentioned above. As a general overview of the process 600, the computer 105 receives the first top-view image 300, receives data from the cameras 110, generates the second top-view image 400 from the data from the cameras 110, converts the first top-view image 300 and the second top-view image 400 to grayscale, identifies the best match region of the first top-view image 300 to the second top-view image 400, determines the estimated location 505 and the estimated heading 510 of the vehicle 100, determines the location and the heading of the vehicle 100, and actuates a component of the vehicle 100 based on the location and the heading. The computer 105 may perform the process 600 once each timestep.

The process 600 begins in a block 605, in which the computer 105 receives the first top-view image 300 of the area 200 obtained by a sensor external to the vehicle 100, as described above.

Next, in a block 610, the computer 105 receives the data from the cameras 110, as described above.

Next, in a block 615, the computer 105 generates the second top-view image 400 of the area 200 based on the data from the cameras 110 from the block 610, as described above.

Next, in a block 620, the computer 105 converts the first top-view image 300 and the second top-view image 400 to grayscale, as described above.

Next, in a block 625, the computer 105 identifies the best match region of the first top-view image 300 to the second top-view image 400, as described above.

Next, in a block 630, the computer 105 determines the estimated location 505 and the estimated heading 510 of the vehicle 100 in the area 200, as described above.

Next, in a block 635, the computer 105 determines the location and the heading of the vehicle 100 based on the estimated location 505 and the estimated heading 510 from the block 630 and based on the previous location and the previous heading of the vehicle 100, as described above. The previous location and heading may come from a previous execution of the process 600 or may be the identified location.

Next, in a block 640, the computer 105 actuates at least one component of the vehicle 100 based on the location and the heading from the block 635. Actuating the component is thereby based on the estimated location 505 and the estimated heading 510 used for determining the location and the heading. The component may include, e.g., the propulsion system 120, the brake system 125, and/or the steering system 130. For example, the computer 105 may actuate at least one of the propulsion system 120, the brake system 125, or the steering system 130. For example, the computer 105 may actuate the steering system 130 based on the distances to lane boundaries as part of a lane-centering feature, e.g., steering to prevent the vehicle 100 from traveling too close to the lane boundaries. The computer 105 may identify the lane boundaries using the first top-view image 300 and/or the sensors 135. The computer 105 may, if the location of the vehicle 100 from the block 635 is within a distance threshold of one of the lane boundaries, instruct the steering system 130 to actuate. For another example, the computer 105 may operate the vehicle 100 autonomously, i.e., actuating the propulsion system 120, the brake system 125, and the steering system 130 based on the location and heading, e.g., to navigate the vehicle 100 through the area 200. After the block 640, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
    receive a first top-view image of an area obtained from a sensor external to a vehicle;
    generate a second top-view image of the area based on data from a camera of the vehicle;
    determine pixel coordinates in the first top-view image that correspond to an image location of the vehicle in the second top-view image based on comparing the first top-view image and the second top-view image,
    determine an estimated location of the vehicle in the area according to the pixel coordinates in the first top-view image; and
    actuate a component of the vehicle based on the estimated location;
    wherein comparing the first top-view image and the second top-view image includes incrementally moving a window having a same set of pixel dimensions as the second top-view image across the first top-view image and identifying a region of the first top-view image encompassed by the window having a greatest similarity to the first top-view image, the identified region defining the pixel coordinates in the first top-view image.

2. The computer of claim 1, wherein the instructions to generate the second top-view image include instructions to generate the second top-view image based on image data from a plurality of cameras of the vehicle including the camera.

3. The computer of claim 2, wherein the cameras are oriented generally horizontally, and the instructions to generate the second top-view image include instructions to project the image data from the cameras to a common horizontal plane.

4. The computer of claim 1, wherein the instructions to compare the first top-view image and the second top-view image include instructions to identify a best match region of the first top-view image to the second top-view image.

5. The computer of claim 4, wherein the instructions to identify the best match region include instructions to compare each of a plurality of comparison regions of the first top-view image to the second top-view image.

6. The computer of claim 5, wherein the instructions to identify the best match region include instructions to:
    determine a score of each comparison region of the first top-view image by comparing the respective comparison region to the second top-view image; and identify the best match region by selecting the comparison region with the best score.

7. The computer of claim 5, wherein the instructions further include instructions to determine the plurality of comparison regions based on an identified location of the vehicle.

8. The computer of claim 4, wherein the instructions further include instructions to determine an estimated heading of the vehicle by rotating the second top-view image and determining the best match region by comparing the second top-view image to the first top-view image after rotating the second top-view image.

9. The computer of claim 1, wherein the instructions to determine the estimated location include instructions to apply an image location of the vehicle in the second top-view image to the first top-view image.

10. The computer of claim 1, wherein the instructions further include instructions to determine a location of the vehicle based on the estimated location and on a previous location of the vehicle.

11. The computer of claim 10, wherein the instructions to determine the location of the vehicle further include instructions to iteratively filter the estimated location and the previous location.

12. The computer of claim 1, wherein the estimated location includes two horizontal coordinates.

13. The computer of claim 1, wherein the instructions further include instructions to determine an estimated heading of the vehicle based on comparing the first top-view image and the second top-view image.

14. The computer of claim 1, wherein the first top-view image lacks metadata of lanes.

15. The computer of claim 1, wherein the first top-view image is grayscale.

16. The computer of claim 1, wherein the second top-view image is grayscale.

17. The computer of claim 1, wherein the first top-view image is a satellite image.

18. The computer of claim 1, wherein the instructions to actuate the component include instructions to navigate the vehicle based on the estimated location.

19. A method comprising:
receiving a first top-view image of an area obtained from a sensor external to a vehicle;
generating a second top-view image of the area based on data from a camera of the vehicle;
determining pixel coordinates in the first top-view image that correspond to an image location of the vehicle in the second top-view image based on comparing the first top-view image and the second top-view image,
determining an estimated location of the vehicle in the area according to the pixel coordinates in the first top-view image; and
actuating a component of the vehicle based on the estimated location;
wherein comparing the first top-view image and the second top-view image includes incrementally moving a window having a same set of pixel dimensions as the second top-view image across the first top-view image and identifying a region of the first top-view image encompassed by the window having a greatest similarity to the first top-view image, the identified region defining the pixel coordinates in the first top-view image.

* * * * *

UNITED STATES PATENT AND TRADEMARK OFFICE
CERTIFICATE OF CORRECTION

PATENT NO. : 12,371,030 B2  
APPLICATION NO. : 18/066299  
DATED : July 29, 2025  
INVENTOR(S) : Ankit Girish Vora et al.

Page 1 of 1

It is certified that error appears in the above-identified patent and that said Letters Patent is hereby corrected as shown below:

In the Claims

Column 15, Line 16, Claim 9:   Change "an" to --the--.

Signed and Sealed this  
Sixteenth Day of September, 2025

Coke Morgan Stewart  
*Acting Director of the United States Patent and Trademark Office*